March 22, 1955     C. H. GUILES     2,704,815
SERVO SYSTEM

Filed July 19, 1943     4 Sheets-Sheet 1

INVENTOR
CHARLES H. GUILES
BY Paul B. Hunter
ATTORNEY

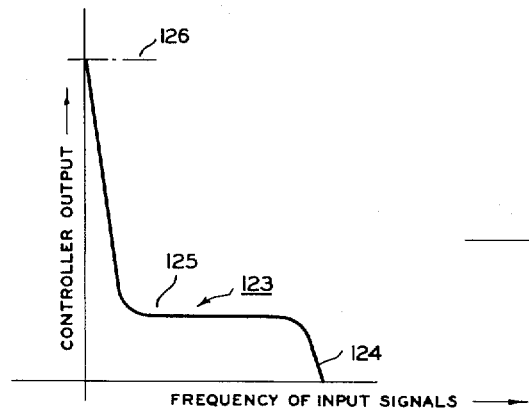
FIG. 2
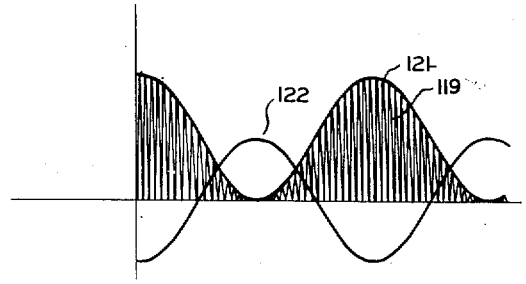
FIG. 3
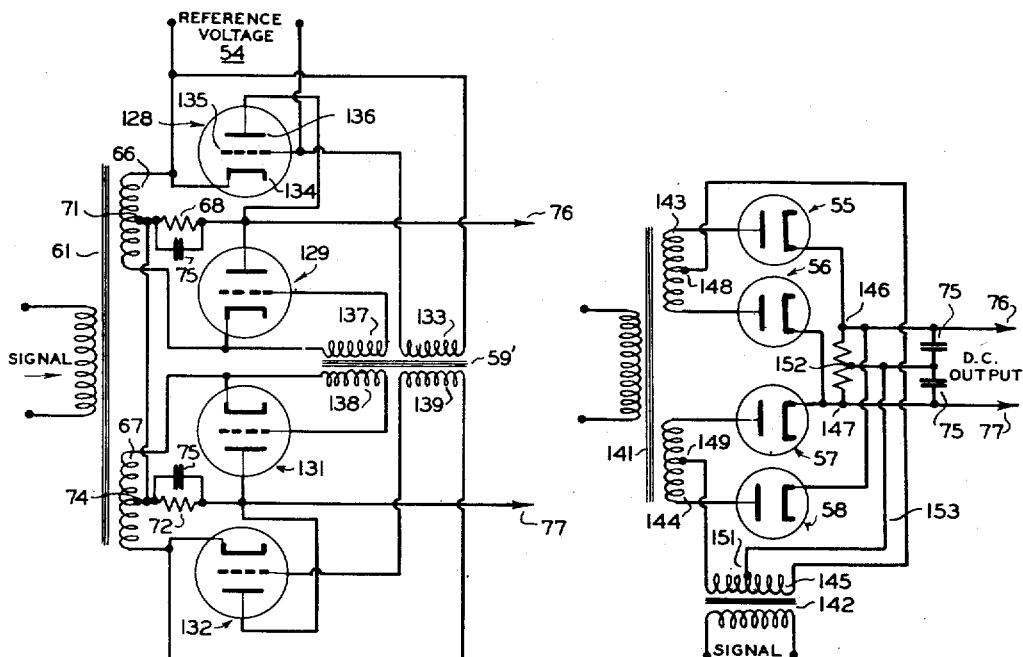
FIG. 4
FIG. 5

March 22, 1955
C. H. GUILES
2,704,815
SERVO SYSTEM
Filed July 19, 1943
4 Sheets-Sheet 3
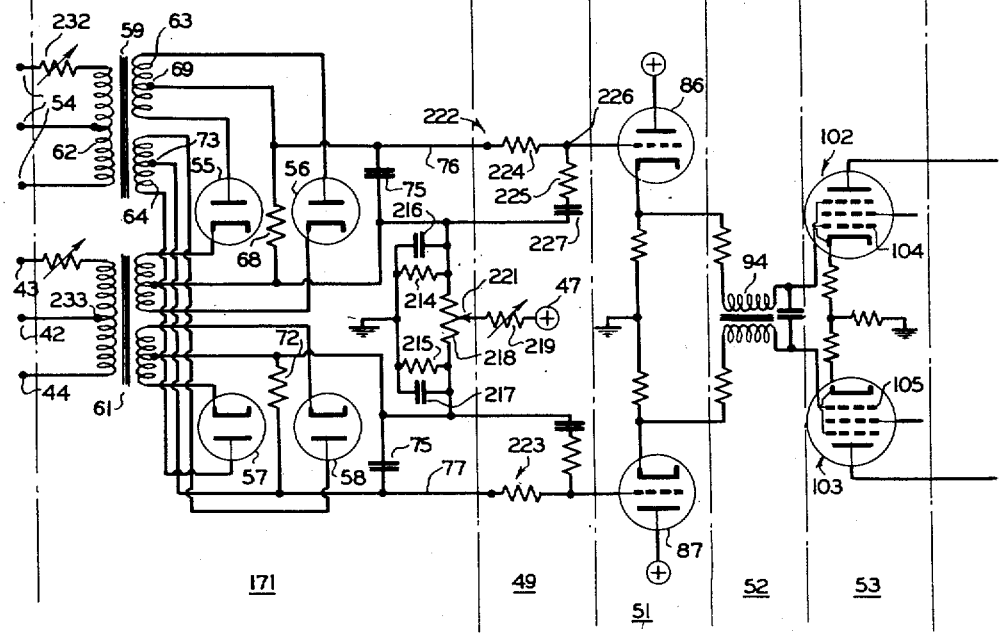
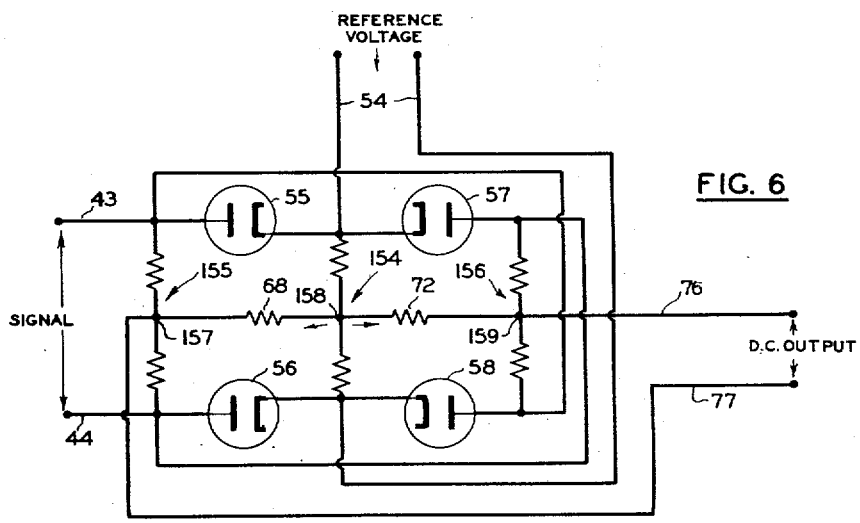
INVENTOR
CHARLES H. GUILES
BY Paul B. Hunter
ATTORNEY March 22, 1955     C. H. GUILES     2,704,815
SERVO SYSTEM Filed July 19, 1943     4 Sheets-Sheet 4

INVENTOR
CHARLES H. GUILES
BY
ATTORNEY

United States Patent Office 2,704,815
Patented Mar. 22, 1955

2,704,815

SERVO SYSTEM

Charles H. Guiles, East Hempstead, N. Y., assignor to The Sperry Corporation, a corporation of Delaware Application July 19, 1943, Serial No. 495,305

21 Claims. (Cl. 307—149)

The present application relates to electric control circuits and concerns particularly circuits utilizing electric discharge devices.

An object of the invention is to provide improved automatic follow-up systems and methods of causing movable elements to correspond smoothly in position to the position of master or control elements.

A further object is to provide improved tracking systems and orientation indicating systems responsive to the relative positions of an object and a control station, either of which may be movable.

Still another object of the invention is to provide servo systems which have little inaccuracy in velocity-tracking but which are relatively unaffected by sudden variations in tracking errors.

A further object is to provide object-locating systems having improved, smoother, and more efficient operation.

An additional object of the invention is to provide phase-sensitive detectors and phase angle indicators with improved characteristics.

Other objects are to provide a full wave rectifier system, to obtain the effect of double frequency inputs to the phase detector, and to reduce the filtering required with phase detectors.

Another object is to provide a phase sensitive device especially adapted to operation with low frequency inputs.

Another object is to provide a phase sensitive detector having a limiting effect.

A further object is to prevent blocking of subsequent vacuum tube stages of a phase sensitive system regardless of the magnitudes of opposing voltages in the phase detector.

An additional object is to provide a free floating ungrounded truly differential output from a phase detector or other opposed-voltage circuit.

Another object is to provide a servo system or the like in which vacuum tubes are operated in the most favorable bias region regardless of input amplitude, especially when push-pull connections are employed.

Another object is to provide velocity error corrections in servo systems.

An additional object is to provide combined integral and proportional velocity control in velocity error correctors, especially when a push-pull arrangement is employed.

Still another object is to provide an improved filter arrangement for preventing unsteadiness of servo operation.

In carrying out the invention in its preferred form in connection with object-tracking systems of the conical-scan pulsed radio microwave type, a scanning-beam type of radiator or antenna is employed with a servo-controlled mechanical driving system for orienting the antenna to track a moving object. A radio receiver is provided responsive to the microwave energy picked up by the antenna, and a demodulating and amplifying system is provided for recovering the pulse envelope from the receiver output to produce a sine wave varying in amplitude and phase in accordance with variations in the relative orientation of the antenna and the object to be tracked. For controlling the antenna driving mechanism, a phase-sensitive system or servo system is interposed between the demodulating system and the mechanical driving mechanism. The phase-sensitive system or servo system includes a phase detector and a vacuum tube controller responsive to the detector output. In order that the system will have a low velocity tracking error but will nevertheless remain steady in the event of a high degree of irregularity in the received signals, in consequence of static, fading, random signals and other effects, a velocity error corrector and a low pass filter are interposed between the phase detector output and the vacuum tube controller. The antenna-driving mechanism may be of any suitable type susceptible of control by an electric controller such as a vacuum tube electric control device.

A better understanding of the invention will be afforded by the following detailed description when considered in connection with the accompanying drawing, and those features of the invention which are believed to be novel and patentable will be pointed out in the claims appended thereto.

In the drawing,

Fig. 2 is a graph illustrating the desired relationship between controller output and frequency accomplished in the apparatus of Fig. 1;

Fig. 3 is a graph illustrative of the principle of operation of phase-sensitive servo systems;

Fig. 4 is a circuit diagram of a modified form of full-wave phase detector;

Fig. 5 is a circuit diagram of another modified form of full-wave phase detector;

Figure 7:
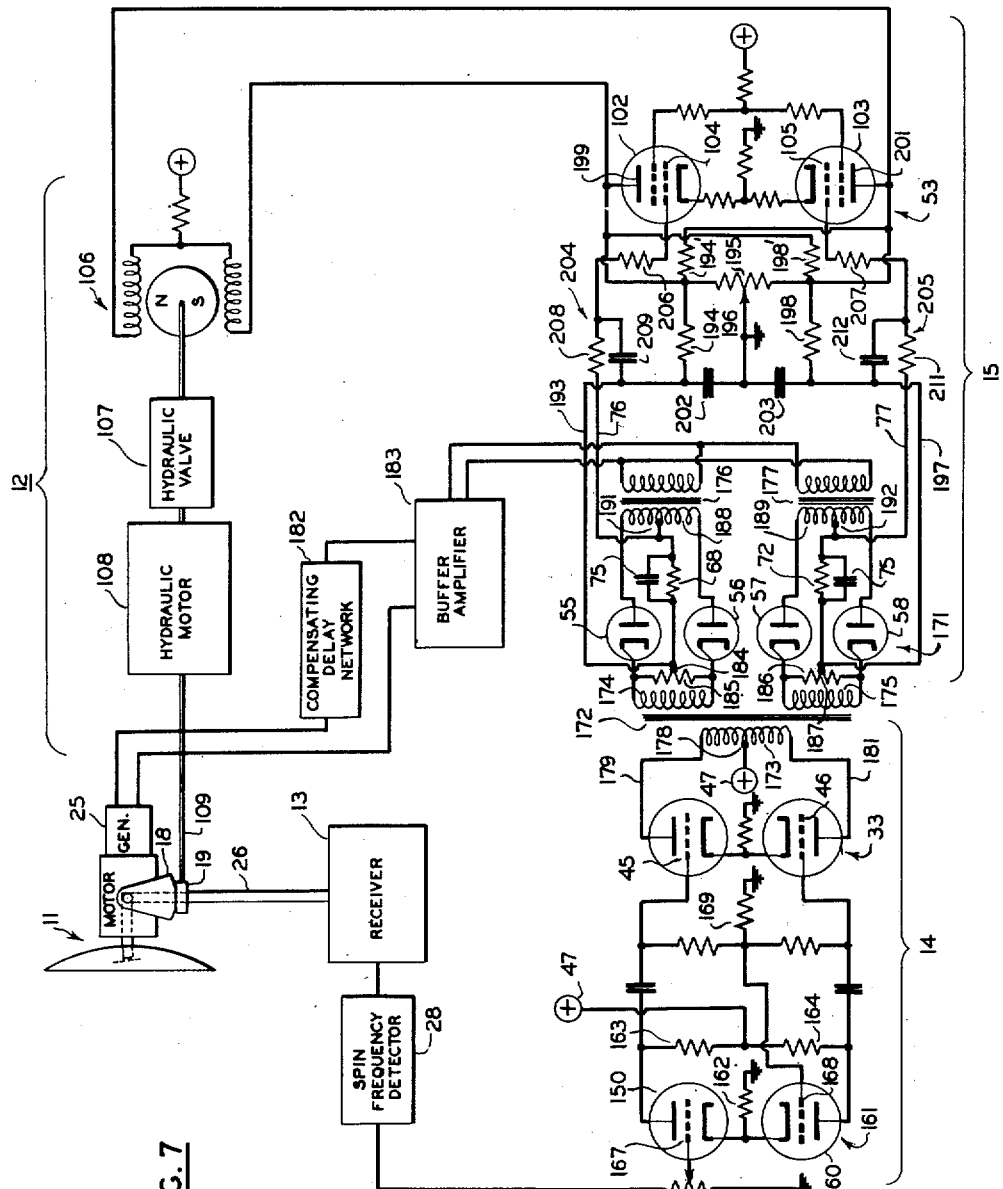

Figs. 6, 7, and 8 are circuit diagrams of other modified forms of full-wave phase detectors.

Like reference characters are utilized throughout the drawings to designate like parts.

Figure 1:
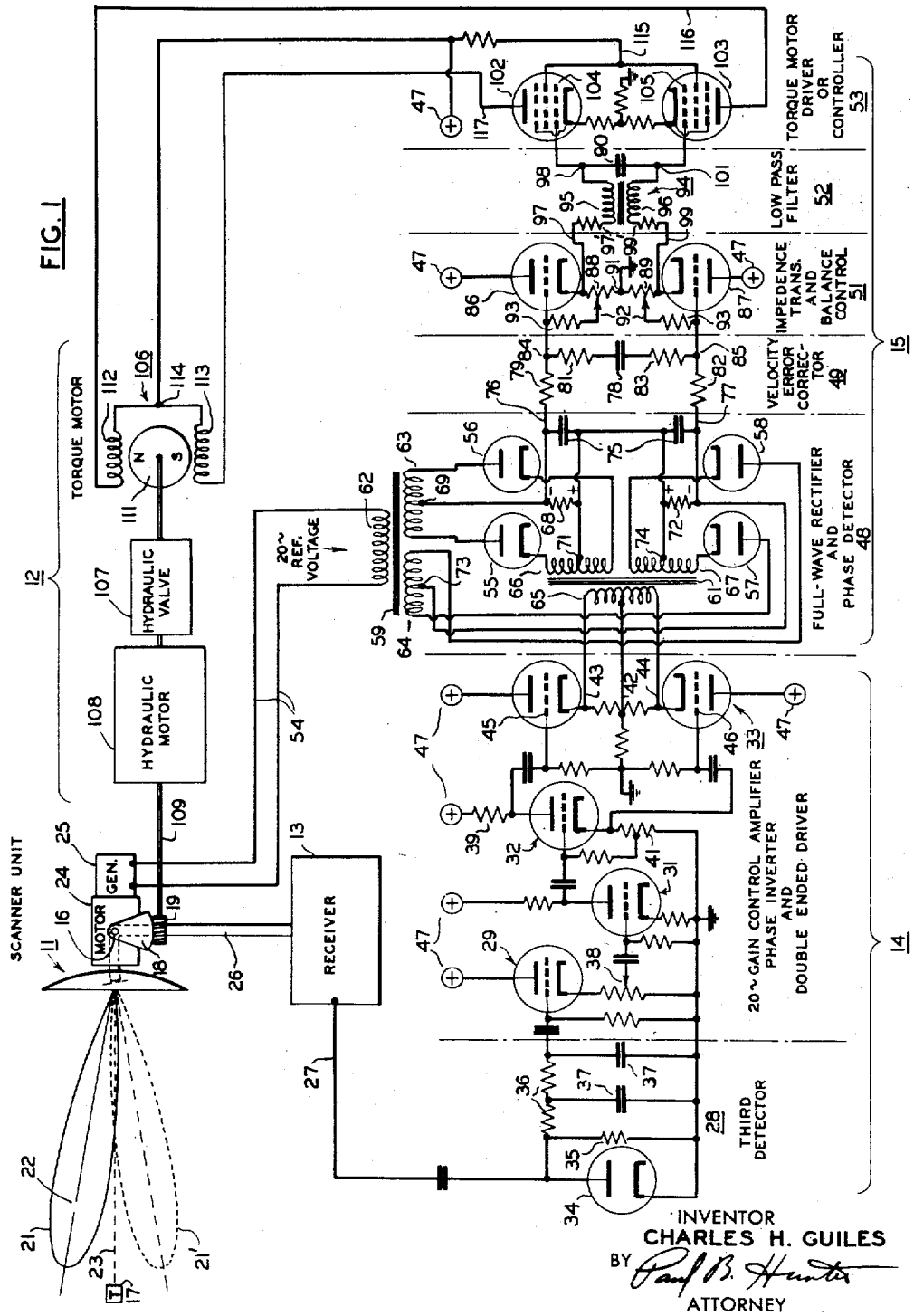
Fig. 1 is a circuit diagram, partially schematic, of an object-tracking system forming one embodiment of the invention.

Although the servo system illustrated in Fig. 1 and the full-wave phase-sensitive detector constituting a part of the illustrated servo system have general utility for various applications and are not limited to use in combination with the other elements illustrated in the drawings, the servo system and the phase-sensitive detector shown provide improved operation of tracking systems for following targets and moving objects, particularly such systems utilizing pulsed ultra high frequency radio or microwaves. Accordingly, a microwave tracking system, improved in accordance with the invention, will be described. The system illustrated in Fig. 1 comprises an antenna 11 which may be of the parabolic radiator type, an antenna-orienting or mechanical driving system 12, mechanically connected to the antenna 11, a radio receiver 13 electrically responsive to microwaves received by the antenna 11, a demodulating and amplifying system 14 responsive to receiver output, and a phase-sensitive control system or servo system 15 interposed between the demodulating system 14 and the mechanical driving system 12 for controlling the operation of the driving system so that it will orient the antenna 11 to the position in which minimum modulation of input signals occurs.

The antenna 11 is illustrated schematically as having an orientation axis 16 about which the entire antenna system may be rotated for the purpose of following a moving object 17. If the object 17 is freely movable in space, it will ordinarily be necessary to have two axes of orientation such as an azimuth axis and an elevation axis. However, for simplicity in the drawing it will be assumed that the object 17 is constrained to move in a fixed plane such as a horizontal plane, and the pivot axis 16 may be considered as an azimuth orientation axis. For example, the object 17 may be assumed to be a floating object such as a ship or an iceberg which is to be tracked for any desired purpose, such as safety of navigation, for fire control during warfare, or for causing a self-propelled barge or vessel without a crew to follow a leading vessel automatically in order that a convoy of vessels may proceed along a channel selected by a single vessel manned by a crew.

For mechanically connecting the antenna system 11 to the driving mechanism 12, a sector gear 18 is shown cooperating with a worm 19 mechanically connected to the driving mechanism 12. The mechanical construction of the antenna system 11 and its supporting means is represented only schematically, but it will be understood that this entire system is supported by a mechanism secured to the sector gear 18. The tracking system employed may be of the conical scan type in which the antenna 11 has a narrow-lobe receptivity pattern 21 having a center of symmetry 22 at a slight angle to an axis 23 about which the antenna 11 is caused to rotate. In this type of system the strength of the received signal will vary or be modulated in accordance with the speed of rotation or spinning speed of the radiator 11 whenever the object 17 is at one side or the other of the axis of rotation 23 of the antenna 11. As illustrated, the antenna 11 is assumed to be in such a position that the center of symmetry 22 of the receptivity pattern 21 is in the plane of the surface of the drawing and the other extreme position of the radiator 11 is 180° from the position 22, being represented by the dotted receptivity pattern 21'.

For rotating or spinning the antenna 11, a suitable motor 24 is provided, and for providing a basis of reference for phase indications, a generator or alternator 25 is provided which is driven synchronously with the antenna 11. Electrical connections from the antenna 11 to the receiver 13 are indicated schematically by a hollow-pipe wave guide 26.

The receiver 13 may be of conventional type such as a superheterodyne microwave pulse receiver including first and second detectors and producing a video output from a channel represented by a conductor 27.

The demodulating and amplifying system 14 comprises a third detector 28, a gain control stage 29, an amplifying stage 31, an inverter stage 32, and a double-ended driver stage 33.

The third detector 28 may comprise a diode 34, capacity coupled to the receiver video connection 27 together with suitable resistors 35 and 36 and condensers 37 for filtering the diode ouput, and recovering the peaks or modulation of the video signal. The gain control stage 29 is shown as a cathode follower vacuum tube with an adjustable output tap 38 for providing gain control. The amplifier 31 may be a conventional resistance-capacity coupled amplifier, and the inverter stage 32 may be a vacuum tube stage having resistors 39 and 41 connected in both the anode and cathode leads in order to produce output signals for exciting the double-ended driver 33. The transformer driver 33 comprises a pair of vacuum tubes connected as cathode followers with a common neutral 42 and cathode connections 43 and 44. The tubes of the stage 33 include control grids 45 and 46 coupled to the anode and cathode, respectively, of the inverter stage 32.

As shown, the successive stages of the demodulating and amplifying system 14 are resistance-capacity coupled in the conventional manner, and one or more current supply sources represented by positive terminals 47 are provided for supplying the anode-cathode currents of the tubes.

The output connections 42, 43, 44 of the transformer driver 33 are carried to the phase-responsive servo system 15 and constitute signal input connections therefor.

The servo system 15 comprises a full-wave rectifier type phase detector 48, a velocity error corrector 49, an impedance transformer and balance control 51, a low pass filter 52, and a current-control device 53, such as a torque motor driver or controller of the vacuum tube type.

The full-wave phase detector 48 comprises a rectifier system responsive to signal voltages received from the connections 42, 43 and 44, and reference voltages received through a connection 54 from the generator 25 which rotates with the antenna 11. The phase detector 48 includes two pairs of asymmetric current-conducting elements such as rectifiers or diode vacuum tubes 55, 56, 57 and 58. For supplying the signal voltage and reference voltage to the rectifiers, a reference voltage transformer 59 and a signal voltage transformer 61 are provided. The reference voltage transformer 59 comprises a core carrying a primary winding 62 and two center-tapped secondary windings 63 and 64. The signal voltage transformer 61 comprises a core carrying a center-tapped primary winding 65 and two center-tapped secondary windings 66 and 67.

The rectifiers 55 to 58 are connected in a manner somewhat analogous to two bi-phase rectifiers in series opposition. Thus, the rectifiers 55 and 56 are connected in series opposition to the ends of the reference voltage transformer secondary winding 63 in series with the halves of the signal voltage transformer secondary winding 66; or the connection may be considered conversely as having the rectifiers supplied by the winding 66 in series with the reference voltage 63. A direct current load resistor 68 is connected between the center taps 69 and 71 of the transformer windings 69 and 66, respectively.

A similar connection is provided for the rectifiers 57 and 58, and there is a second direct current load resistor 72 connected between center taps 73 and 74, respectively, of transformer windings 64 and 67. Preferably, the resistors 68 and 72 are by-passed by smoothing condensers 75, and the resistors 68 and 72 are connected in series to a pair of conductors 76 and 77 serving as direct current or output connections from the phase detector 48. The relation of the resistors 68 and 72 to the rectifier polarities is such that the output voltages across the two resistors act in opposition or differentially between the connections 76 and 77. It will be observed that the pairs of transformer secondary windings 63—64 and 66—67 are not connected in the same relationship to the rectifier pairs 55—56 and 57—58. It will be assumed for convenience that the transformer secondary windings have the polarity indicated by the geometry of the figure, that is, that the right-hand ends of the windings 63 and 64 are positive at the same instant and, likewise, that the upper ends of the windings 66 and 67 are of the same polarity at a given instant. However, the upper end of the transformer winding 66 is connected to the left-hand end of the transformer winding 63 through the rectifier 55, whereas the lower end of the transformer winding 67 is connected to the left-hand end of the transformer winding 64 through the rectifier 57. Consequently the left-hand portion of winding 63 and the upper portion of winding 66 act aiding when the left-hand portion of winding 64 and the lower portion of winding 67 act in opposition and vice versa.

The velocity error corrector 49 comprises capacity in series with tapped resistance. As illustrated, it comprises specifically a condenser 78 connected in series between a pair of resistors 79—81 and a second pair of resistors 82—83 to form a series circuit between the phase detector output connections 76 and 77. The junction terminal 84 of the resistors 79 and 81 and the junction terminal 85 of the resistors 82—83 constitute the output terminals of the velocity error corrector 49.

The impedance transformer 51 comprises a pair of electric discharge devices such as triode vacuum tubes 86 and 87 connected as cathode followers with a pair of cathode resistors 88 and 89, the junction terminal 91 of which is grounded. For balance control separately adjustable biasing taps 92 may be provided. It will be understood that the tubes 86 and 87 have conventional grid leak resistors 93.

The low pass filter 52 comprises a condenser 90 and a mutual inductance or 1:1 ratio transformer 94 having a pair of windings 95 and 96. The winding 95 is connected between an output connection 97 from the tube 86 and a filter output terminal 98, and the winding 96 is connected between an output connection 99 from the tube 87 and a second output connection 101. Preferably resistors 97' and 99' are connected in series in respective branches of the low pass filter to reduce the resonant peak. The condenser 90 is connected between the output terminals 98 and 101. The windings 95 and 96 are so connected that the mutual inductance of the transformer 94 adds to the self-inductances of the windings 95 and 96 with respect to the transfer of energy between the input connections 97, 99 and the output terminals 98, 101.

The motor controller 53 comprises a pair of current-controlling devices 102, 103 of the electric discharge type, for example, such as pentode vacuum tubes, push-pull connected with control electrodes or grids 104 and 105, connected to the filter output terminals 98 and 101, respectively. Additional stages of amplification may be provided, if desired, depending upon the type of apparatus employed in the mechanical driving system 12. Such additional stages of amplification are omitted from the drawing, however, for the sake of simplicity.

The driving system 12 may be of any suitable type, but for the sake of illustration it is shown as a hydraulic system including a torque motor 106 electrically responsive to the phase-sensitive control system 15, a hydraulic valve 107 controlled by the torque motor 106, and a hydraulic motor 108 controlled by the valve 107 with an output shaft 109 connected in a suitable manner to the worm 19 meshing the sector gear 18.

The torque motor 106 may be of any desired type, being shown as of the split winding type. As shown, the motor 106 comprises a permanent-magnet rotor 111 and a stator consisting of a pair of windings 112 and 113, connected to produce magnetic fields of opposite polarity. The common terminal 114 of the windings 112 and 113 is connected through a conductor to the positive terminal 47 of the source serving as the power supply for the tubes 102 and 103 of the torque motor driver or controller 53, a voltage dropping resistor connecting said source through conductor 115 with the screen grids of tubes 102 and 103. The windings 112 and 113 are connected in series with the anodes of the tubes 103 and 102 through conductors 116 and 117, respectively.

When the target or other object 17 is located within the range of the tracking apparatus illustrated in Fig. 1, radio impulses emitted from the object 17 are received through the antenna 11 by the receiver 13. Such impulses may either be generated by means on the object 17 or may be reflected therefrom as a result of radiation produced by a transmitter (not shown) adapted to energize the antenna 11 or another antenna also carried by the tracking apparatus. As the antenna 11 rotates, unless the object 17 lies along the axis of rotation 23, the received pulses of microwave energy will be modulated at the spin frequency or frequency of rotation of the antenna 11. This may, for example, be approximately 20 cycles per second. Such received pulses are represented in Fig. 3 by the vertical lines 119, and the modulation envelope is represented by the sine wave 121. The third detector 28 recovers the modulations and produces a sine wave corresponding to the wave 121 which is amplified by the stages 29 and 31.

The inverter stage 32 produces a double-ended output corresponding to the wave 121 which is in turn amplified by the transformer driver 33 and supplied to the signal voltage transformer 61 of the phase detector 48. Unless the target 17 is, for example, directly below the axis of rotation 23 or in some other arbitrarily chosen datum position, the modulation envelope 121 will be out of phase with the voltage produced by the generator 25 represented by the sine wave 122 in Fig. 3. The output of each half of the phase detector depends upon the phase relation of the input voltage.

When phase quadrature exists or when the signal voltage is zero, the direct current outputs in the resistors 68 and 72 are equal and opposite, resulting in zero output from the connections 76 and 77. On the other hand, if the phase relation departs from quadrature, the signal voltage increases the direct current in one resistor and decreases it in the other (for signal voltages below a limiting value), unbalancing the voltage drops in the resistors 68 and 72. Accordingly, a direct current or unidirectional voltage output appears between the phase detector output connections 76 and 77. The amplitude of this output depends upon the degree of deviation between the scanner axis of rotation 23 and the position of the object 17. The phase detector output thus depends on the relative orientations of the axis 23 and the object 17, being reversed in case the object 17 crosses the axis 23.

Such a direct current output is supplied through the intermediate stages 49, 51, 52 to the torque motor driver 53, unbalancing the tubes 102 and 103 and causing an unbalance in the currents in windings 112 and 113 of the torque motor 106. According to the direction of unbalance, the hydraulic valve 107 is set to operate the hydraulic motor 108 in one direction or the other and at a speed determined by the degree of unbalance so that the antenna 11 is re-oriented until its axis of rotation or directional axis 23 extends toward the object 17. The greater the deviation or error, the greater the speed of the hydraulic motor 103, and accordingly, the greater the rapidity with which the error is corrected. On the other hand, as the antenna 11 approaches the correct position in which the error is smaller, the speed of the hydraulic motor 108 diminishes and overshoot is thereby minimized.

If the object 17 is moving or if the apparatus carrying the tracking system is moving with respect to the object 17, an additional problem is presented in that it is necessary to correct not merely for static error but for errors in the dynamic conditions. Thus, it is necessary under such conditions for the hydraulic motor 108 to be operating at such a speed that the angular tracking velocity corresponds to the angular velocity of the object 17 relative to the tracking apparatus.

Operation with a minimum of errors would call for a quick response servo system. However, in apparatus responsive to radio signals without means for discriminating between proper signals and spurious ones, difficulty arises from the fact that the tracker driving mechanism tends to operate in response to random signals, static, noise, fading, and the like. Fading, for example, introduces a modulation of the received radio signal which may have a frequency with components of the same order as the tracking errors to be corrected. Substantial components of such spurious demodulation may be of the order of 20 cycles per second. In order to eliminate the effect of such spurious signals, a filter may be interposed which cuts off above a predetermined value of frequency, such as one and one-half cycles per second, three cycles per second, and the like, and for this purpose a low pass filter such as the filter 52 may be employed.

Although the filter 52 eliminates the effect of fading at frequencies above the cut-off value, for example one and one-half cycles, such a filter destroys the high frequency response of the system and introduces delay. In this manner it interferes with the stability of the system. These difficulties may be overcome by reducing the gain of the amplification in order to avoid excessive hunting. With the reduction of gain, however, velocity errors are increased. Such velocity errors are removed by means of the velocity error corrector 49 which adjusts the gain according to frequency. Inasmuch as the system is rendered unstable by filtering only at frequencies above a critical value such as $2/10$ cycle for example, the velocity error corrector is so adjusted as to act below such a critical frequency for building up the gain. The arrangement is such that at frequencies above the critical frequency a voltage supplied to the grids of the impedance transformer 51 is cut to a fixed fraction of the output voltage between the phase detector output connections 76 and 77, and for very low frequencies substantially the full output voltage of the phase detector is applied to the grids of the impedance transformer.

For example, at very low frequencies the condenser 78 has very nearly infinite impedance, and the action is the same as if the condenser 78 were not present. At higher frequencies, however, the condenser tends to integrate the phase detector output voltage between the connections 76 and 77. If the connections to the impedance transformer were taken across the condenser 78, substantially complete integration and smoothing would be obtained. However, there would tend to be a large error in the velocity tracking. Accordingly, the input to the impedance transformer 51 is taken from the junction terminals 84 and 85. Consequently, in the case of very abrupt changes in the output voltage of the phase detector 48 or high frequency variations, the output of the phase detector 48 is attenuated by the resistors 79 and 82, and the full effect is not transferred immediately to impedance transformer 51, thus permitting the condenser 78 to provide some integrating action. However, such error is stored by the velocity error corrector 49, and if it persists, the correction voltage is transmitted through the impedance transformer 51.

On the other hand, in the case of very gradual changes in position of the object 17 or very low frequency velocity errors, the condenser 78 and the attenuating resistors 81 and 83 are substantially without effect, and the correction is transferred immediately to the impedance transformer 51. Thus combined integral and proportional velocity control are obtained.

For further improving the operation, the low pass filter 52 is interposed between the impedance transformer 51 and the torque motor driver 53.

Inasmuch as radio receiver systems are subject to numerous spurious signals such as effects of fading, static and effected signals from other objects not intended to be tracked, a fast-acting servo system designed for low velocity tracking inaccuracy will be very unsteady in operation inasmuch as it would attempt to follow all of such spurious and transient signals. It is therefore desirable to provide a servo system which acts promptly but which, nevertheless, is unresponsive to such signals of short duration. A desirable characteristic is illustrated in the graph of Fig. 2, in which the output of the controller 53 is measured vertically, and the frequency of the demodulated input signals is measured horizontally. Thus, at zero frequency it is desirable that full output be obtained. With increasing frequency up to about two-tenths cycles per second, it is desirable that the output increase substantially inversely with frequency, and from a frequency of about two-tenths cycles per second to one and one-half cycles per second it is desirable that the controller output remain substantially constant, falling off to substantially zero as the frequency increases above one and one-half cycles per second. The characteristic curve 123 illustrated in Fig. 2, is obtained by the velocity error corrector 49 and the low pass filter 52. Thus, the constants of the low pass filter 52 are so chosen as to provide a cut-off frequency of about one and one-half cycles per second corresponding to the cut-off point 124 of the curve 123 shown in Fig. 2. In the event that the flat portion 125 of the curve is desired to have an amplitude of approximately one-thirtieth of the maximum point 126, the resistors 79 and 81 and, likewise, the resistors 82 and 83 of the velocity error corrector 49 may be so chosen that the ratio of resistance of the resistor 81 to the resistor 79 is approximately one to thirty, and the capacity of the condenser 78 is chosen as to present a relatively small impedance at about one cycle per second as compared with the resistances in question. Thus, at zero frequency no voltage divider action takes place, and the full voltage output is obtained. However, as the frequency increases, the impedance 78 becomes relatively small, and the resistance pairs 79—81 and 82—83 act as voltage dividers cutting down the output from terminals 84 and 85. With increasing frequency, the voltage divider ratio remains substantially constant since the impedance of the condenser 78 is negligible. The curve 123 therefore remains constant until the point is reached at which the low pass filter 52 cuts off to produce the sharply descending portion 124 of the curve shown in Fig. 2.

Owing to the fact that the full-wave phase detector of Fig. 1 gives what may be called a double frequency effect, it is well adapted for use in systems having low frequency inputs and requires relatively little filtering. As a result of the full-wave rectification, current effects are produced by each of the transformers 59 and 61 in each of the resistors 68 and 72 during each half cycle of input voltage. Thus, the frequency of fluctuation of the current in resistors 68 and 72 is twice the frequency of the input sources from the demodulator 14 and the reference voltage generator 25. Since adequate filtering without bulky equipment is difficult at low frequencies, the arrangement of Fig. 1 is decidedly advantageous in order to permit operation with low frequency inputs.

In the arrangement of Fig. 1 the phase detector output between the output connections 76 and 77 is freely floating, that is to say, the output is merely a difference in potential between the connections 76 and 77, and neither connection is tied to a fixed potential with respect to ground or any other datum. Consequently, the potential difference between the control grids of the tubes 86 and 87 in the impedance transformer 51 may be obtained without driving either grid into an unfavorable bias region, and symmetrical operation of the tubes 86 and 87 may be obtained. Furthermore, the arrangement prevents blocking of one or the other of the tubes such as might occur if one of the connections 76 or 77 required an exceedingly high or exceedingly low potential with respect to the cathodes of the tubes 86 and 87. For example, the potential difference between the ends of the resistor 68 or between the ends of the resistor 72 may be very great so as to cause blocking or operation in an unfavorable region of one of the tubes 86 and 87 if the resistors 68 and 72 were tied to a datum potential such as ground. However, with the arrangement shown, even though the voltage in the resistors 68 and 72 may be very large, the tubes 86 and 87 operate symmetrically, and their control grids are subjected only to potentials varying in accordance with the difference in potential between the connections 76 and 77 or the differential output of the load resistors 68 and 72.

In addition to the foregoing effect which prevents excessive potentials from being applied to either of the connections 76 and 77, the phase detector 48 has an inherent limiting effect whenever the signal voltage from the transformer 61 exceeds the reference voltage from the transformer 59.

The currents in the resistors 68 and 72 are equal, giving zero differential output when the input signal from the transformer 61 is zero or when the input voltages from the transformers 59 and 61 are in quadrature. Then as the component of voltage of the transformer 61 in phase or 180° out of phase with the reference voltage increases from zero, the direct current in one of the resistors is increased and that in the other resistor is decreased, causing a difference in the outputs and a phase-responsive voltage between the connections 76 and 77. With increasing in or out-of-phase component of signal voltage, a further suppression of current in one resistor and increase of current in the other continues until the component of signal voltage opposing the reference voltage equals the reference voltage whereupon the current in one of the load resistors becomes zero and that in the other resistor becomes double its initial value. With further increase of magnitude of the signal voltage, however, the signal voltage component overcomes the reference voltage acting in the resistor in which the voltages have been acting in opposition, and both the resistors 68 and 69 carry current in the same direction. Increasing signal voltage component thereafter causes the current in each resistor to increase but to maintain a fixed difference. Under these circumstances the output between the connections 76 and 77 is limited to the fixed-difference value regardless of the magnitude of the in or out-of-phase component of the signal voltage applied to the transformer 61.

Although a specific form of full-wave phase detector having two electrode rectifying elements has been illustrated in Fig. 1 and described in connection therewith, it will be understood that the invention in the combination of other elements with the phase detector is not limited to the precise arrangement illustrated and described. For example, the servo system of Fig. 1 may also be operated utilizing a full-wave phase detector having grid controlled rectifying units such as illustrated in Fig. 4, for example.

The full-wave phase detector of Fig. 4 comprises a signal transformer 61, a reference voltage or phasing transformer 59' having four secondary windings, and four rectifying units 128, 129, 131 and 132 together with elements corresponding to those shown in Fig. 1, such as the load resistors 68 and 72 with by-pass condensers 75. As in Fig. 1, the load resistors of Fig. 4 are connected in series opposition to output connections 76 and 77.

Although the reference voltage transformer 59' may take the form of a five-winding transformer having a primary winding connected to supply-conductors 54 and having four secondary windings each connected to one of the rectifying elements, the transformer 59' is shown simply as a four-winding transformer with one of the windings 133 serving both as a secondary winding controlling the rectifying element 128 and as an input winding connected across the supply conductors 54.

The rectifying element 128 comprises an anode 136, a cathode 134, and a control electrode or grid 135. The transformer winding 133 is connected between the cathode 134 and the grid 135 for controlling the conductivity of the rectifying element 128 which may take the form of a triode vacuum tube, if desired. The rectifying elements 129, 131, and 132 have similar control connections from transformer windings 137, 138, and 139, respectively.

The transformer connections are such that the windings 133 and 137 supply potentials of opposite polarity at any given instant to the control grids of the tubes 128 and 129. Consequently, relatively large current will flow in the triodes 128 and 129 alternately during successive half cycles of the voltage of the winding 66 if the signal and reference voltages are in phase. A similar condition exists with respect to the transformer winding 67 and the tubes 131 and 132. However, the relationship of the pair of windings 137 and 133 to the winding 66 is made opposite from the relationship of the pair of windings 138, 139 to the windings 67 in order that when the tubes 128 and 129 are rendered highly conducting during positive half cycles of anode voltage, the tubes 131 and 132 will be rendered non-conducting or reduced in conductance during positive half cycles of anode voltage, and vice versa. Thus, for one phase relationship between the input voltages to the transformer 61 and 59', greater current will flow in the resistor 68, and for the opposite phase relationship greater current will flow in the resistor 72. For intermediate phase relationships, the relative duration of conductivity of the pair of tubes will depend upon the phase relationship. Accordingly, the magnitude of the differential output from the connections 76 and 77 and the polarity thereof will depend upon the grid relationship between the input to the transformers 59 and 61.

Another form of full-wave phase detector is illustrated in Fig. 5, in which two-electrode rectifiers are employed with two input transformers 141 and 142, one of the transformers being a reference voltage transformer and the other a signal voltage transformer. The transformer 141 has two center-tapped secondary windings 143 and 144, and the transformer 142 has a single center-tapped winding 145. A pair of series-connected load resistors 146 and 147 are provided. Rectifiers 55 and 56, arranged in opposing relation are provided for connecting the ends of the transformer 143 to the ends of the load resistor 146 and 147. Similarly, rectifiers 57 and 58, also in opposing relation, are arranged to connect the ends of the secondary winding 144 to the ends of the load resistor 146 and 147.

The windings 143, 144, and 145 are provided with center taps 148, 149 and 151, respectively. The winding 145 is connected between the center taps 148 and 149, and the center tap 151 of winding 145 is connected to the junction terminal 152 of the load resistors 146 and 147. The polarities of the rectifiers 55 and 58 are such that they tend to pass current in the same direction through the resistor 146, and the polarities of the rectifiers 56 and 57 are such that they tend to pass current in the same direction through the resistor 147, the potential drops in the resistors 146 and 147 being in opposition. It will be observed that the phase detector of Fig. 5 provides a free-floating output between the connections 76 and 77 which is truly a differential output and not biased to a fixed relation with any datum potential.

Although in the foregoing figures transformer windings are utilized, it will be understood that the invention is not limited to the use of transformer windings throughout. For example, the feature of a free-floating output may be obtained from the phase detector of Fig. 1, if a center-tapped resistor such as the resistor 154 of Fig. 6 is substituted for the two center-tapped transformer windings 63 and 64 of Fig. 1. Furthermore, if the free-floating feature is not required in the phase detector, the transformer windings 66 and 67 of Fig. 1 may also be replaced by center-tapped resistors 155 and 156, as illustrated in Fig. 6.

In the arrangement of Fig. 6 both of the resistors 155 and 156 are connected between the signal voltage input conductors 43 and 44. However, they are connected in opposite relation, as will be explained more in detail hereinafter. The center-tapped resistor 155 is connected across the reference voltage input conductors 54. The rectifiers 55 and 56 are arranged in opposing relation to connect the ends of the resistor 154 to the resistor 155, and the rectifiers 57 and 58 are arranged in opposing relation to connect the ends of the resistor 154 to the ends of the resistor 156. The direct-current load resistor 68 is connected between center taps 157 and 158 of the resistors 155 and 154, respectively, and resistor 72 is connected between the center tap 158 and a center tap 159 of the resistor 156. The upper end of the resistor 156 is connected to the lower end of the resistor 155, and the lower end of resistor 156 is connected to the upper end of the resistor 155 so that when the input potentials across the resistors 155 and 154 tend to produce currents in the same direction across the load resistor 68, the input potentials across resistors 154 and 156 tend to produce currents in opposite directions in the resistor 72, and vice versa. Accordingly, a difference in potential is produced between the output connections 76 and 77 dependent upon the phase relationship between the voltages between the conductors 54 and between the conductors 43 and 44. However, the potentials of the connections 76 and 77 will not be independent of absolute potentials of the conductors 43, 44, and 54.

Another servo system connection is illustrated in Fig. 7.

The tracking system illustrated in Fig. 7 comprises a radiator or antenna 11, an antenna driving system 12, a pulsed microwave receiver 13, a spin-frequency demodulating system 14, and a phase-sensitive servo system or driver-controlling system 15.

The demodulating system 14 comprises a spin-frequency detector 28, a split inverter 161, and a transformer driver 33. The split inverter 161 or floating paraphrase comprises a pair of electric discharge devices such as triode vacuum tubes, having a common cathode resistor 162 and parallel anode resistors 163 and 164 connected to the positive terminal 47 of the common power supply. The tube 150 has a control electrode or grid 167 coupled to the output of the spin frequency detector 28. Tube 160, however, has a control electrode 168 biased to ground through a resistor 169.

The anodes of the tubes 150 and 160 are resistance-capacity coupled to the two control electrodes 45 and 46 of the transformer driving stage 33. The grid leak resistor 169 serves also for biasing the grids 45 and 46.

The servo system 15 comprises a phase-sensitive detector 171 and a torque motor driver or controller 53, which may correspond to that shown in Fig. 1. The phase detector 171 comprises a signal voltage transformer 172 having a split primary winding 173 and a pair of secondary windings 174 and 175, a pair of reference voltage transformers 176 and 177, and rectifiers 55, 56, 57 and 58. Transformer winding 173 has a center tap 178 connected to the power supply positive terminal 47 and has its ends connected through conductors 179 and 181 to the anodes of the transformer driver stage 33.

The transformers 176 and 177 are energized in parallel from a buffer amplifier 183 connected through a compensating delay network 182 to the reference voltage generator 25.

For providing a mid-potential, a terminal 184 is maintained at a potential between the potentials at the ends of the transformer winding 174. For this purpose a resistor 185 is connected across the transformer winding 174 having its mid-point connected to the terminal 184. Similarly, the transformer winding 175 is provided with a potential-dividing resistor 186 and a mid-potential terminal 187.

The transformers 176 and 177 have secondary windings 188 and 189, and mid-terminals 191 and 192, respectively. The load resistors 68 and 72 are connected between the pair of mid-potential terminals 184 and 191 and the pair of mid-potential terminals 187 and 192, respectively. The right-hand ends of the resistors 68 and 72 are connected to the output connections 76 and 77, respectively. The left-hand ends of those resistors are returned to fixed bias points. The left-hand end of the resistor 68 is connected through a conductor 193, and a resistor 194, to the upper end of a balancing potentiometer 195. Likewise, the left-hand end of the load resistor 72 is connected through a conductor 197, and a resistor 198, to the lower end of the potentiometer 195.

For providing positive direct current feed-back, the ends of the balancing potentiometer 195 are cross-connected through voltage-dividing resistors 198' and 194' to the anodes 199 and 201, respectively, of the torque motor controller tubes 102 and 103. For filtering the feed-back voltage, by-pass condensers 202 and 203 are provided, which have a large time constant with the resistors 194 and 198.

For limiting high frequency variations in the output of the torque motor driver 53 and producing the desired steadiness thereof, low pass filters 204 and 205 are interposed between the output connections 76 and 77 and the control grids 104 and 105 of the tubes 102 and 103. To assist in damping out parasitic oscillations, grid resistors 206 and 207 are provided. The filter 204 comprises a resistor 208 and a grounded condenser 209, and similarly the filter 205 comprises a resistor 211 and a grounded condenser 212.

Inasmuch as the feed-back voltage from the tubes 102 and 103 supplied to the mid-terminals 184 and 186 of the resistors 185 and 187 is filtered by the large-time-constant circuits 194—202 and 198—203, a strong feed-back and consequently high amplification of the error signal is provided at relatively low frequencies of a signal input to the phase detector, and the feed-back falls to zero for high frequencies. Thus, the characteristic curve of the servo-control circuit 15 of Fig. 7 corresponding to Fig. 2 would be asymptotic to the vertical axis instead of intercepting the vertical axis with a large negative slope, as shown in Fig. 2. Positive feed-back results from the fact that the feed-back connections are crossed. The fact that the feed-back varies inversely with frequency provides velocity error correction somewhat analogous to that provided by the velocity error corrector 49 of Fig. 1.

Fig. 8 discloses a phase sensitive servo control system in which the phase sensitive detector 171 is returned to a fixed bias point. The arrangement of the signal voltage transformer 61 and the reference voltage transformer 63 is, however, similar to that illustrated in Fig. 1.

The inner ends of the phase detector load resistors 68 and 72 are grounded through positive bias resistors 214 and 215 respectively, and by-pass condensers 216 and 217 respectively are connected across the resistors 214 and 215. For adjusting the bias and balacing the inputs to the impedance transformer tubes 86 and 87, a potentiometer 218 and an adjusted bias resistor 219 are provided. The potentiometer 218 includes an adjustable tap 221 and the resistor 219 is connected between the tap 221 and the positive power supply terminal 47.

The velocity error corrector 49 in this case comprises two grounded units 222 and 223 interposed in the phase detector output connections 76 and 77 respectively. The velocity error corrector unit 222 comprises a pair of resistors 224 and 225 having a junction terminal 226 and being connected in series with a condenser 227. The resistor 224 is interposed between the phase detector output connection 76 and the control grid of the impedance transformer tube 86. The pair of elements 225 and 227 is connected in series between the junction terminal 226 and the grounding resistor 214. The velocity corrector unit 223 comprises elements corresponding to those described in connection with the unit 222.

In the arrangement of Fig. 8 the bias region in which the tubes 86 and 87 are operated is adjusted by adjustment of the rheostat 219 and the potentiometer 218. The provision of positive bias and balance adjustment tends to guard against either of the tubes 86 or 87 being blocked by being driven beyond the negative cutoff in case of enlarged output from either of the phase detector load resistors 68 or 72. It will be understood that the elements 218 and 219 are to be adjusted when operating conditions change, in order to maintain the tubes 86 and 87 in their proper bias region.

For the purpose of maintaining the proper relationship between the amplitude of the reference and signal voltages and preventing outputs of such magnitude as to block the subsequent vacuum tube stages, input adjustment rheostats 232 and 233 may be connected in series with the primary windings of the transformers 59 and 61 respectively.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A servo mechanism comprising, in combination, a phase-sensitive detector having an output connection, a velocity error corrector comprising a condenser and two resistors connected in series to said phase detector output connections, a low pass filter having input and output connections, and a voltage-responsive control device connected to the output connections of the filter, the condenser and one of the resistors of said velocity error corrector being connected in series across the input connections of said low pass filter.

2. A full-wave phase-sensitive detector comprising, in combination, a signal input transformer, a reference voltage input transformer, two pairs of rectifying units, a pair of output terminals and a pair of load resistors connected in series between said output terminals, each of said transformers having two secondary windings, and means for supplying potential intermediate the potentials of the ends of the secondary windings, one of said pair of rectifying units being connected in series opposition between one of said signal transformer secondary windings and one of said reference voltage transformer secondary windings, the other of said pairs of rectifying units being connected in series opposition between the second of said signal transformer secondary windings and the second of said reference voltage transformer secondary windings, each rectifier being interposed between the ends of two transformer windings, each load resistor being connected between the mid-potential terminal associated with one transformer secondary winding and the mid-potential terminal associated with the other transformer winding of the series connected group, the transformer windings being so connected as to act in opposition in one series connected group when acting aiding in the other series connected group, and vice versa, whereby the variation in phase between inputs to the transformers increases the output of one load resistor and decreases it in the other load resistor, and the differential output varies in accordance with variations in phase relationship.

3. A full-wave phase-sensitive detector comprising, in combination, two pairs of voltage terminals for supplying voltages to be compared in phase, a third terminal with means for maintaining it at a potential intermediate the potentials of the first pair of terminals, a transformer connected to be energized by the second pair of terminals and having a pair of secondary windings, each with a mid-terminal with means for maintaining it at a potential intermediate the potentials at the end of the transformer winding, a pair of rectifying units connected in series opposition between said first pair of terminals and one of said transformer secondary windings, a second pair of rectifying units connected in series opposition between said terminals and said second transformer secondary winding, output terminals, a pair of load resistors connected in series therebetween, each of said load resistors being connected at one end to one of said transformer mid-terminals and at the other end to said first-mentioned mid-terminal, said transformer windings being so connected as to aid the voltage of said first pair of terminals in one series connected group when opposing in the other series connected group, and vice versa, whereby a differential output appears in said load resistors varying in accordance with variations in phase relationship.

4. A full-wave phase-sensitive detector comprising, in combination, a transformer adapted to be energized by one of two voltages to be compared in phase, two secondary windings included in said transformer, each having mid-terminal means maintained at a potential intermediate the potentials at the ends of the transformer winding, a pair of rectifiers connected in series opposition to one of said transformer windings and in parallel aiding relation to the transformer mid-terminal means, a second pair of rectifiers connected in series opposition to the ends of the second transformer winding and in parallel aiding relation to the transformer mid-terminal means, means for supplying to each of said serially connected circuits a second voltage to be compared in phase relationship with the voltage energizing the transformer, and mid-terminal means for establishing a potential intermediate the terminal potentials of said second voltage, a first load resistor connected between said latter mid-terminal means and the mid-terminal means of the first transformer secondary winding, a second load resistor connected between said latter mid-terminal means and the mid-terminal means of the second secondary winding, said transformer windings being so connected as to aid the second voltage in one serially connected circuit when opposing in the other serially conected circuit, and vice versa, whereby a differential output appears in said load resistors variable in accordance with variations in phase relationship.

5. A free-floating output phase detector comprising a pair of load resistors connected in series, having a junction terminal and having end terminals serving as output terminals of the detector, a pair of transformer secondary windings with intermediate potential means each connected to the junction terminal of said resistors, rectifying means connected to one of said transformer secondary windings, rectifying means connected to the other of said transformer secondary windings, and means for supplying to each of the transformer circuits a voltage to be compared in phase with the transformer voltage, the connections being such that the transformer voltage aids said second voltage in one rectifier circuit and opposes it in the other rectifier circuit, whereby a differential output appears across said resistors variable in accordance with variations in phase.

6. A phase detector comprising a pair of load resistors in series with output terminals at the free ends of the resistors and a junction terminal, rectifier means in circuit relation with one resistor, rectifier means in circuit relation with the other, and connections for supplying two voltages to be compared in phase to each of the rectifier circuits, but in opposite relation in one circuit to the relation in the other whereby the difference output of said resistors varies in accordance with variation in voltage phase relation.

7. A phase splitter comprising in combination a variable-impedance device with a control element to which an input signal may be applied, a power supply and a pair of load impedances in series with said supply and said impedance device in either side of said device, whereby voltages of opposite phase appear on said load impedances.

8. In a servomotor control system of the character described, a phase-sensitive amplifier having an input adapted to receive a control signal and an output adapted to control a motor, means for filtering out signal components above a predetermined rate of change value, and means for controlling the gain of said system as a function of the rate of change of the signal.

9. In a servomotor control system, a phase-sensitive amplifier having an input adapted to receive a control signal voltage and an output adapted to be connected to control a motor, means for filtering out voltage components corresponding to signal input frequencies above a predetermined value, and means for controlling the gain of said amplifier in accordance with the frequency of the signals.

10. In a servomotor control system, a phase-sensitive amplifier having an input adapted to receive a control signal voltage and an output adapted to be connected to control a motor, means for filtering out voltage components corresponding to signal input frequencies above a predetermined value, and means for decreasing the gain of said amplifier with increasing signal frequencies.

11. In a servomotor control system, a phase-sensitive amplifier having an input adapted to receive a control signal voltage and an output adapted to be connected to control a motor, means for filtering out voltage components corresponding to signal input frequencies above a predetermined value, and means for decreasing the gain of said amplifier with increasing signal frequencies to a frequency value materially below the lowest filtering out frequency value whereby to provide a range of signal frequency values for which the gain is substantially constant.

12. In a servomotor control system, a phase-sensitive amplifier having an input adapted to receive an alternating control signal voltage and an output adapted to be connected to control a motor, said amplifier comprising phase sensitive rectifier means for providing a unidirectional voltage having a polarity and magnitude corresponding to the phase sense and magnitude of said input signal, means for filtering out output voltage components of said rectifier corresponding to signal input frequencies above a predetermined value, and means for decreasing the gain of said amplifier with increasing signal frequencies.

13. In a servomotor control system, a phase-sensitive amplifier having an input adapted to receive an alternating control signal voltage and an output adapted to be connected to control a motor, said amplifier comprising phase sensitive, differential rectifier means for providing a differential unidirectional voltage having a polarity and magnitude corresponding to the phase sense and magnitude of the input signal, a low pass filter, and means for controlling the gain of said amplifier as an inverse function of the frequency of the input signals within a frequency range embraced within the range of frequencies passed by said filter.

14. The combination recited in claim 13 in which the gain-control means is interposed between the rectifier means and the low pass filter and the output of said filter is connected to the output of said amplifier.

15. In a servomotor control system, a phase-sensitive amplifier having an input adapted to receive an alternating control signal voltage and an output adapted to be connected to control a motor, said amplifier comprising phase sensitive, differential rectifier means for providing a differential unidirectional voltage having a polarity and magnitude corresponding to the phase sense and magnitude of the input signal, a low pass filter, and means including an impedance-reactance network connected to receive the output of said rectifier means for decreasing the gain of said amplifier with increasing rate of change of the output signal of said rectifier means.

16. The combination recited in claim 15 in which the impedance-reactance network comprises a resistance and capacitance connected in series across the output of said rectifier.

17. In a servomotor control system, a phase-sensitive amplifier having an input adapted to receive a control signal voltage and an output adapted to be connected to control a motor, means for filtering out voltage components corresponding to signal input frequencies above a predetermined value, and a feedback circuit including filter means for increasing the feedback as the signal frequency diminishes whereby to increase the gain of said amplifier with decreasing signal frequencies.

18. The combination recited in claim 17 in which the filter means in the feedback circuit comprises a network including impedance and reactance having such values and being so constructed and relatively arranged as to provide higher feedback at lower signal frequencies.

19. In a servomotor control system, a phase-sensitive amplifier having an input adapted to receive an alternating control signal voltage and an output adapted to be connected to control a motor, said amplifier comprising phase sensitive rectifier means for providing a unidirectional voltage having a polarity and magnitude corresponding to the phase sense and magnitude of said input signal, and means for deceasing the gain of said amplifier for relatively high signal frequencies and for increasing the gain for relatively low signal frequencies.

20. In a servomotor control system, a phase-sensitive amplifier having an input adapted to receive an alternating control signal voltage and an output adapted to be connected to control a motor, said amplifier comprising phase sensitive rectifier means for providing a unidirectional voltage having a polarity and magnitude corresponding to the phase sense and magnitude of said input signal, and means for decreasing the gain of said amplifier as the signal frequencies increase from a zero value.

21. In a servomotor control system, the combination with a phase sensitive amplifier adapted to provide a voltage output dependent upon the phase sense and magnitude of a signal voltage supplied thereto, of means responsive to the frequencies of said signal voltage for controlling the gain of said amplifier to increase the gain for lower signal frequencies and to decrease the gain for higher signal frequencies.

References Cited in the file of this patent

UNITED STATES PATENTS

| | | |
|---|---|---|
| 1,624,682 | Shea | Apr. 12, 1927 |
| 2,138,966 | Hafner | Dec. 6, 1938 |
| 2,225,653 | Monk | Dec. 24, 1940 |
| 2,308,521 | Lear | Jan. 19, 1943 |